June 29, 1965  J. PIGNONE ETAL  3,191,491
HEAD FOR OVERHEAD PROJECTORS
Filed Dec. 26, 1961  3 Sheets-Sheet 1
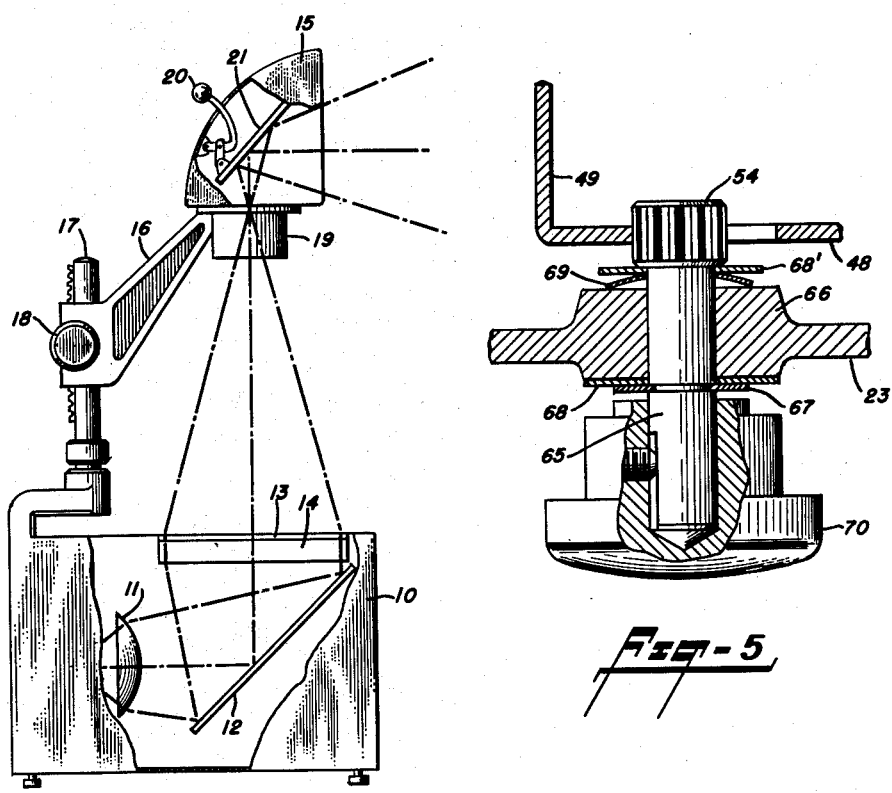
FIG-1
FIG-5
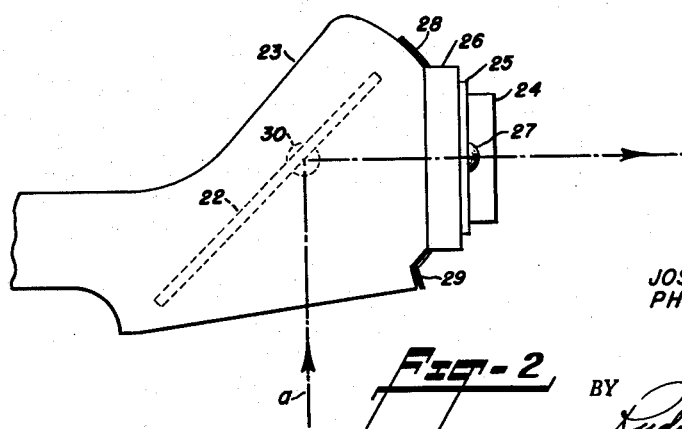
FIG-2
JOSEPH PIGNONE and
PHILIP M. FIELD
INVENTORS
BY
ATTORNEY

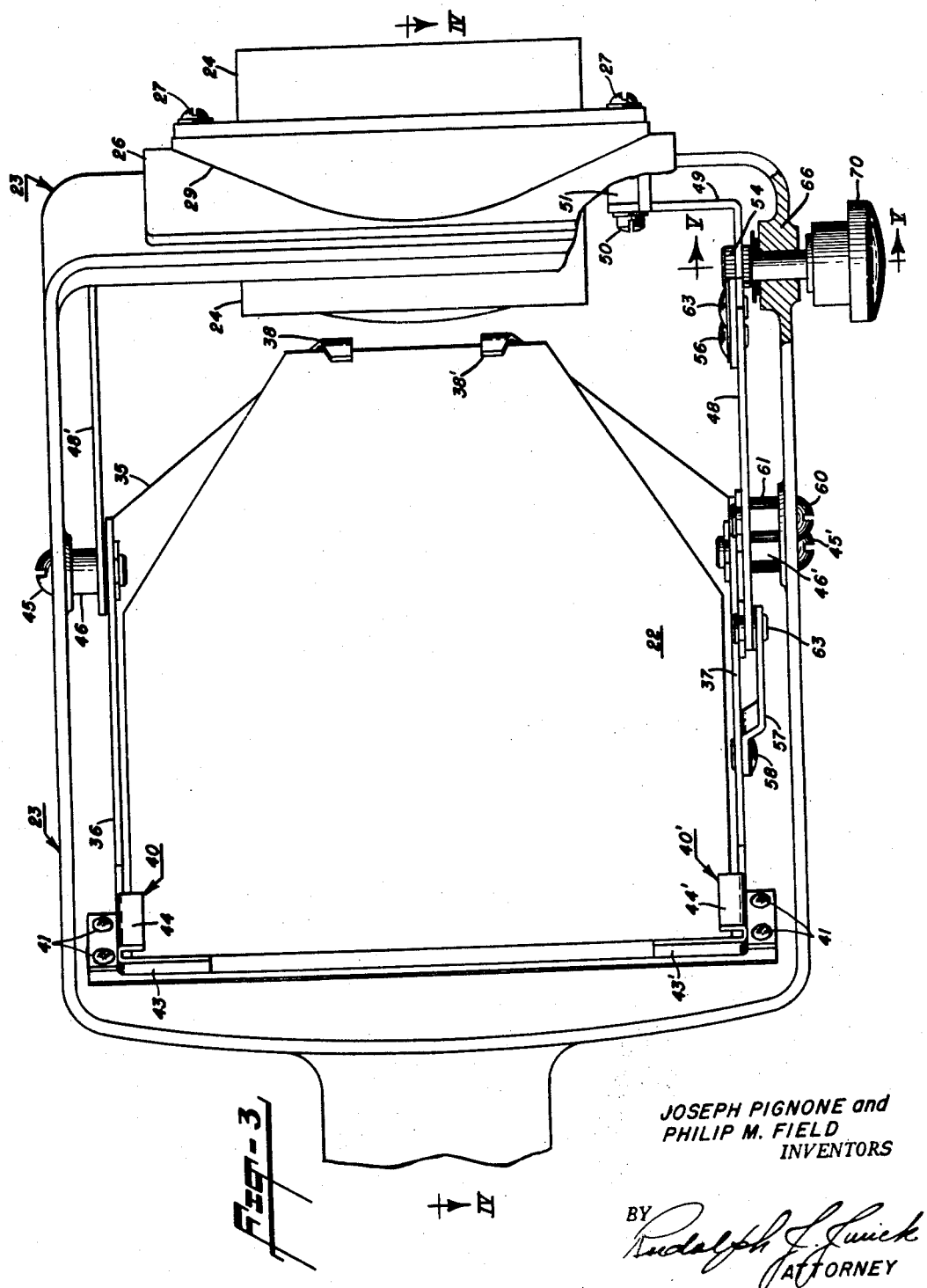

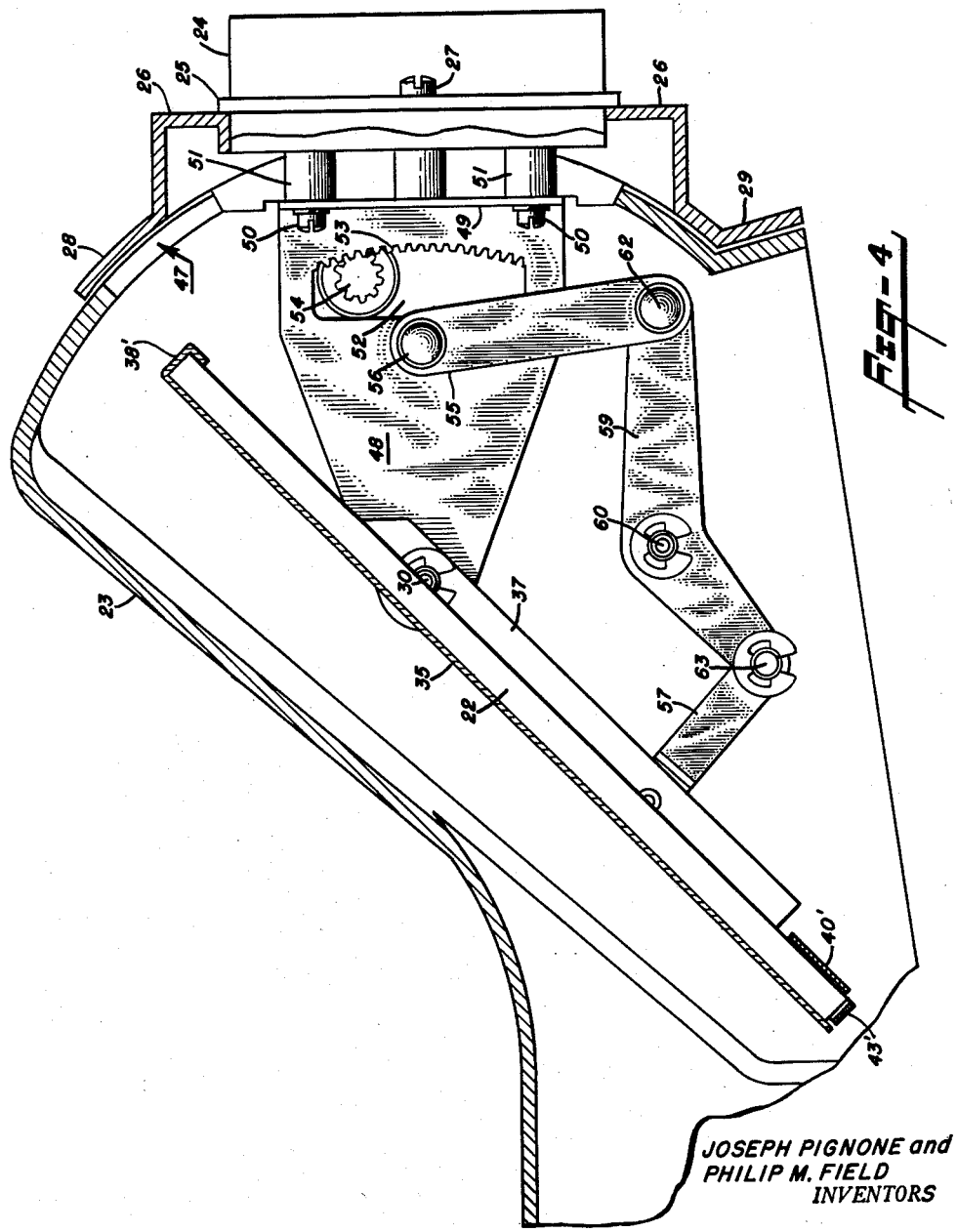

United States Patent Office 3,191,491
Patented June 29, 1965

3,191,491
HEAD FOR OVERHEAD PROJECTORS
Joseph Pignone, West Orange, and Philip M. Field, Maplewood, N.J., assignors to Charles Beseler Company, East Orange, N.J., a corporation of New Jersey
Filed Dec. 26, 1961, Ser. No. 161,928
7 Claims. (Cl. 88—24)

This invention relates to photographic projectors and more particularly to the novel construction of the projection head for an overhead projector.

Overhead projectors generally comprise a housing which carries a light source and associated optical system for directing a vertical light beam through a transparent plate, or projecting stage, closing an opening formed in the top wall of the housing. The projection head is carried by a carriage that is slidably supported on a vertical post extending from the housing. Such head carries a lens and a light-reflecting mirror to effect a projection of the image onto a vertical screen. A manually-operable handle is provided whereby the carriage can be slidably positioned along the supporting post to thereby focus the optical image on the screen. Normally, the lens of the projection head is positioned ahead of the mirror and the vertical elevation of the projected image, on the screen, is effected by changing the angular tilt of the mirror. Since the lens position remains fixed relative to the light beam, the elevation of the projected image is limited to a relatively small extent as beyond such extent the peripheral portions of the screen image fall out of focus.

An object of this invention is the provision of a novel projection head for an overhead projector.

An object of this invention is the provision of a projection head for an overhead projector, said head carrying an angularly-disposed light-reflecting mirror and a lens, with the mirror disposed ahead of the lens in the light beam of the projector.

An object of this invention is the provision of an overhead projection head carrying a lens and a light-reflecting mirror and which includes manually-operable means for altering the angular tilt of the mirror and simultaneously tilting the lens to twice the angle of movement imparted to the mirror.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a view showing an overhead projector of the type to which this invention relates;

FIGURE 2 is a side view of a projection head made in accordance with this invention;

FIGURE 3 is a bottom view of the projection head drawn to an enlarged scale, and with certain parts broken away;

FIGURE 4 is a cross-sectional view taken along the line IV—IV of FIGURE 3; and

FIGURE 5 is a cross-sectional view, drawn to an enlarged scale and taken along the line V—V of FIGURE 3.

Referring, now, to FIGURE 1, there is shown an overhead projector, of conventional construction, comprising the housing 10, which carries a lamp (not shown), a condensing lens 11, a tilted light-reflecting mirror 12, a transparent plate, or projecting stage, 13, and a Fresnal lens 14. The optical system is such that a vertical light beam is directed to the projection head 15 carried by a carriage 16 that is slidably mounted on a post 17 extending upwardly from the housing. Although forming no part of the present invention, it is pointed out that adjustment of the spacing between the projection head 15 and the stage 13, for purposes of focusing the image upon a vertical screen, is effected by rotation of the knob 18. The lens of the projection head is disposed within a barrel 19 and a handle 20 affords a means for changing the angular tilt of the mirror 21 for changing the elevation of the projected image.

The projection head, made in accordance with this invention, is shown in the side view of FIGURE 2. A tilted mirror 22 is disposed within the housing 23, which housing is open at the bottom. The lens of the projection head is carried by a barrel 24, provided with an external flange 25, which is secured to a lens mount 26, as by screws 27, said mount including the fins 28 and 29. As will be described in more detail hereinbelow, the lens mount 26 and the mirror 22 are rotatable, simultaneously, about a common axis identified in FIGURE 2 by the numeral 30. In this arrangement, the light beam entering the projection head, as indicated by the line marked "a," is reflected outwardly through the lens by the mirror 22. It is here pointed out that the housing 23, shown broken off, can be formed integral with, or attached to, a suitable carriage that is carried by and slidable along the supporting post of the projector.

Reference now is made to FIGURES 3 and 4. The light-reflecting mirror 22 is supported on a plate 35, having upturned sides 36, 37. The mirror is secured in fixed position relative to the plate by the integral plate tabs 38, 38' extending over the upper edge of the mirror, and the clips 40, 40' removably secured to the plate as by the screws 41. These clips include integral portions 43, 43', supporting the lower edge of the mirror, and portions 44, 44' extending over the side edges of the mirror. The plate 35 is pivotally mounted within the housing by axially-aligned rivets 45, 45' passing through aligned holes formed in the side walls of the housing and in the upturned sides 36, 37 of the plate, the spacer bushings 46, 46' serving to center the mounting plate and the mirror within the housing. The axis of the rivets 45, 45' constitutes the pivotal axis of the mirror and corresponds to the axis identified by the numeral 30 in FIGURES 2 and 4.

The front surface of the projection head housing 23 is arcuate, falling on a circle having a center corresponding to the mirror pivot axis 30, and is provided with an aperture 47. Such aperture is closed by the lens mount 26 and the projecting fins 28 and 29. A sector-shaped plate 48 extends in spaced relationship along a side wall of the housing and is provided with a hole, at the narrow end, and is rotatably mounted on the rivet 45'. The other end of the sector-shaped plate includes an integral, upturned end portion 49 and the lens mount 26 is secured to such upturned end portion by the screws 50 and the bushings 51. Formed in the sector-shaped plate 48 is a slot 52 having teeth 53 formed in forward, arcuate side wall, said teeth lying on a circle, having its center at the mirror pivot axis 30, and in mesh with a pinion gear 54. A similar sector-shaped plate 48', pivotally mounted on the rivet 45 and having an upturned end secured to the lens mount, is disposed at the other side of the housing. Thus, effectively, the lens mount (carrying the lens barrel 24) is carried by spaced arms (the two sector-shaped plates 48, 48') and is rotatable about the same axis as the mirror 22, namely, the axis 30, which falls on the optical axis of the projector.

Elevation of the light beam emerging from the projection head is effected by angularly rotating the mirror 22 about the axis 30. In order to maintain the focus of the projected image on the screen, it is necessary that the lens also be tilted about the axis 30 an angular extent equal to twice the angular displacement of the mirror. This is accomplished by a linkage mechanism comprising a first link arm 55 (having one end pivotally secured to the sector-shaped plate 48 by a rivet 56) a second link arm 57 (pivotally secured to the adjacent, upturned side 37 of the lens-supporting plate 35 by the rivet 58) and a rocker arm 59 (pivotally secured to the side wall of the housing by a rivet 60 and spaced therefrom by a bushing 61), the ends of the rocker arm being pivotally attached to the respective arms 55 and 57 by the rivets 62 and 63. The mechanical arrangement is such that a clockwise rotation of the pinion gear 54, as viewed in FIGURE 3, results in an upward angular displacement of the lens about the axis 30 and a simultaneous clockwise angular displacement of the mirror also about the axis 30, the coupling factor of the linkage mechanism being such that, within the movement provided, the lens displacement is always twice that of the mirror.

As shown most clearly in FIGURE 5, the pinion gear 54 is secured to one end of a shaft 65 passing through a boss 66 of increased thickness formed integral with a side wall of the housing 23. The shaft 65, having a circumferential groove formed therein for accommodating a retaining ring 67, carries flat washers 68, 68', a spring washer 69, and has a knob 70 secured to the outer end.

The linkage mechanism, connecting the lens and lens mount back to the operating knob 70, involves a mechanical disadvantage (in this direction) and this mechanical disadvantage working in combination with the friction factor provided by the spring washer 69 renders the lens and lens mount self-supporting in any position to which it has been set. In other words, the lens structure would have to back drive the operating knob and this it cannot do by virtue of the mechanical disadvantage and the friction factor.

Having now described our invention, those skilled in this art will be able to make various changes and modifications in the illustrated construction and it is intended that such changes and modifications fall within the scope and spirit of the invention as recited in the following claims.

We claim:
1. A projection head for an overhead projector comprising:
   (a) a housing adapted to receive a light beam,
   (b) a light-reflecting mirror pivotally mounted within the housing,
   (c) a lens carried by the housing,
   (d) means mounting the lens for rotation about the pivotal axis of the said mirror, said means including a rotatable member having a plurality of tooth elements lying in a circle having a center on the pivotal axis of the mirror, and
   (e) manually-operable means for simultaneously rotating the lens and the mirror, said means including a knob external of the housing and secured to a pinion gear that is in mesh with the said tooth elements.

2. The invention as recited in claim 1, wherein the said rotatable member is mechanically coupled to the said mirror by a linkage mechanism such that the angular rotation of the lens is twice that of the mirror.

3. A projection head for an overhead projector comprising:
   (a) a housing having side walls, an open bottom for receiving a light beam and a front wall,
   (b) means forming a lens opening in the front wall of the housing,
   (c) a lens mount external of the housing and closing the opening in the housing front wall,
   (d) a fixed lens carried by the said lens mount,
   (e) supporting means secured to the lens mount and pivotally mounted within the housing for rotation about a fixed axis that is normal to and intersects the lens axis,
   (f) a light-reflecting mirror,
   (g) a plate mounted for rotation about the said fixed axis,
   (h) means securing the mirror to the plate, and
   (i) manually-operable means extending through a side wall of the housing for simultaneously rotating the said supporting means and the said plate.

4. The invention as recited in claim 3, wherein the means for simultaneously rotating the supporting means and the plate comprises:
   (j) a plurality of tooth elements formed on the said supporting means and lying on an arc that is concentric with the said fixed axis,
   (k) a pinion gear in mesh with said tooth elements and secured to a shaft extending through the said side wall of the housing,
   (i) a linkage mechanism mechanically coupled to the said supporting member and the said plate, the mechanical advantage of said linkage mechanism being such that the angular rotation of the said plate is one half the angular rotation imparted to the said supporting means.

5. The invention as recited in claim 4, wherein a portion of the front housing wall is convex and lying on a circle concentric with the said fixed axis, and wherein the said lens mount includes portions overlying the convex housing wall irrespective of the angular position of the lens.

6. A projection head for an overhead projector comprising:
   (a) a housing having a light-receivivng opening in the bottom and an arcuate front wall,
   (b) a lens carried by a barrel extending through a lens opening formed in the front wall of the housing,
   (c) a lens mount secured to the said barrel and having portions overlying the arcuate front wall of the housing,
   (d) a first supporting arm extending along one inner side wall of the housing and secured to the said lens mount,
   (e) a second supporting arm extending along the other inner side wall of the housing and secured to the lens mount,
   (f) means pivotally securing the said supporting arms to the housing for rotation about a fixed axis which is normal to and intersects the lens axis,
   (g) a plurality of tooth elements formed in said first supporting arm, said tooth elements lying on a circle concentric with the said fixed axis,
   (h) a mounting plate carrying a light-reflecting mirror, said mirror positioned to reflect light rays entering the housing outwardly through the said lens,
   (i) means pivotally supporting said mounting plate for rotation about the said fixed axis,
   (j) a linkage mechanism mechanically coupled to the said mounting plate and the said first supporting arm,
   (k) a pinion gear in mesh with the said tooth elements, and
   (l) means disposed externally of the housing for rotating said pinion gear.

7. The invention as recited in claim 6, wherein the said linkage mechanism comprises a rocker arm pivotally secured to a side wall of the housing, a first arm pivotally connected to the said first supporting arm and one end of the rocker arm, and a second arm pivotally connected between the said mounting plate and the other end of the rocker arm, the arrangement being such that rotation of the said pinion gear imparts a simultaneous angular rotation of the lens and the mirror about the said fixed axis with the displacement of the lens always twice that of the mirror.

(References on following page)

References Cited by the Examiner

UNITED STATES PATENTS

| | | | |
|---|---|---|---|
| 154,607 | 9/74 | Holmes | 88—24 |
| 937,266 | 10/09 | Robertson | 88—24 |
| 2,320,247 | 5/43 | Roger | 88—26 |
| 2,496,647 | 2/50 | Woodbury | 88—24 |
| 2,859,660 | 11/58 | Lucas | 88—24 |
| 2,863,356 | 12/58 | Goldberg | 88—24 |
| 3,055,261 | 9/62 | Braun et al. | 88—24 |

FOREIGN PATENTS 397,418 8/33 Great Britain.
484,250 5/38 Great Britain.

LEO SMILOW, *Primary Examiner.*
EMIL G. ANDERSON, *Examiner.*